United States Patent [19]

Isobe et al.

[11] 3,953,884

[45] Apr. 27, 1976

[54] VIDEO AMPLIFIER FOR DERIVING COLOR SIGNALS

[76] Inventors: Mitsuo Isobe, 5-103, Fujitacho, Moriguchi, Osaka; Toshihiko Yoshino, 7-404, Miyokenzaka 5-chome, Katano, Osaka, both of Japan

[22] Filed: Oct. 15, 1974

[21] Appl. No.: 514,371

[52] U.S. Cl. .............................. 358/30; 330/30 D
[51] Int. Cl.² ........................................ H04N 9/52
[58] Field of Search .............. 330/30 D, 69; 358/30

[56] References Cited
UNITED STATES PATENTS

| | | |
|---|---|---|
| 3,624,275 | 11/1971 | Lunn .................................. 358/30 |
| 3,628,168 | 12/1971 | Kobayashi ......................... 330/30 D |
| 3,706,937 | 12/1972 | Hanna ............................... 330/30 D |

Primary Examiner—George H. Libman
Attorney, Agent, or Firm—Burgess, Ryan & Wayne

[57] ABSTRACT

A video amplifier is disclosed wherein the luminance signal is applied to the collector circuit of a differential amplifier comprising two transistors, the color difference signal is applied to the base of one of the two transistors, and the primary color signal is derived across a load resistor coupled to the collector circuit.

7 Claims, 6 Drawing Figures

VIDEO AMPLIFIER FOR DERIVING COLOR SIGNALS

BACKGROUND OF THE INVENTION

The present invention realtes to generally a color television receiver and more particularly a video amplifier therefor combined with a matrix circuit for combining the luminance signal with the color difference signals.

In general, the Y or luminance signal of the color television or colorplexed video signal is transmitted with a wide band while the chrominance signal, with a narrow band. The luminance signal and the carrier chrominance signal are recovered by the luminance and chrominance signal processing circuits, respectively, in the television receiver, and are combined in a matrix circuit to derive the primary color signals which control the intensities of the beam currents in a picture tube for the reproduction of the picture in color.

In the prior art video amplifier combined with the matrix circuit of the type described above, the color difference signal amplifier comprises a common-emitter transistor with the feedback and collector output capacitances of the order of 1.5 to 2.5 PF. The high-frequency component of the luminance signal applied to the collector is negatively fed back so that the high-frequency components of the primary color signal derived from the collector are lost. That is, the color difference signal amplifier must be so designed that even though its function is to amplify the color difference signal transmitted with a narrow band, it must minimize the loss of the high-frequency components of the luminance signal. To overcome this problem, it has been proposed to connect a Darlington circuit consisting of transistors to the base of the transistor in the color difference signal amplifier. In other words, a low-output impedance conversion circuit is connected to the color difference signal amplifier so as to minimize the effects due to the collector feedback capacitance of the transistor in the color difference signal amplifier. However the above circuit arrangement is very complex. Moreover the emitter of the transistor in the color difference signal amplifier is grounded so that the DC operating point drifts due to the ambient temperature variation. Therefore it is not desirable to directly couple the output of the video amplifier to the picture tube. Especially the -G primary color signal changes in the direction opposite to that of the other -R and -B primary color signals due to the temperature drift of an inverter so that the white or color balance in the picture tube is adversely affected.

SUMMARY OF THE INVENTION

One of the objects of the present invention is therefore to provide a video amplifier for a color television receiver which may eliminate an impedance conversion circuit used in the conventional video amplifiers and in which primary color signals with excellent qualities may be recovered from the combination of the luminance signal with the color difference signal in a matrix circuit which is very simple in construction.

Another object of the present invention is to provide a video amplifier which minimizes the loss of the high-frequency components of the luminance signal in the matrix circuit.

A further object of the present invention is to provide a video amplifier which minimizes the adverse effects due to the temperature drift upon the transistors making up the matrix circuits, thereby ensuring stable operation.

To attain the above and other objects, according to the present invention, the luminance signal is applied to the collector circuit of a differential amplifier comprising a first transistor and a second transistor with their emitters connected together; the color difference signal is applied to the base of the first transistor; and the primary color signal is derived across a load resistor inserted in the collector circuit. Therefore, stable operation and hence excellent reproduction of the picture in color may be ensured.

The present invention will becom more apparent from the following description of the preferred embodiments thereof taken in conjunction with the accompanying drawing.

DESCRIPTION OF THE PREFERRED EMBODIMENTS

Figure 1:
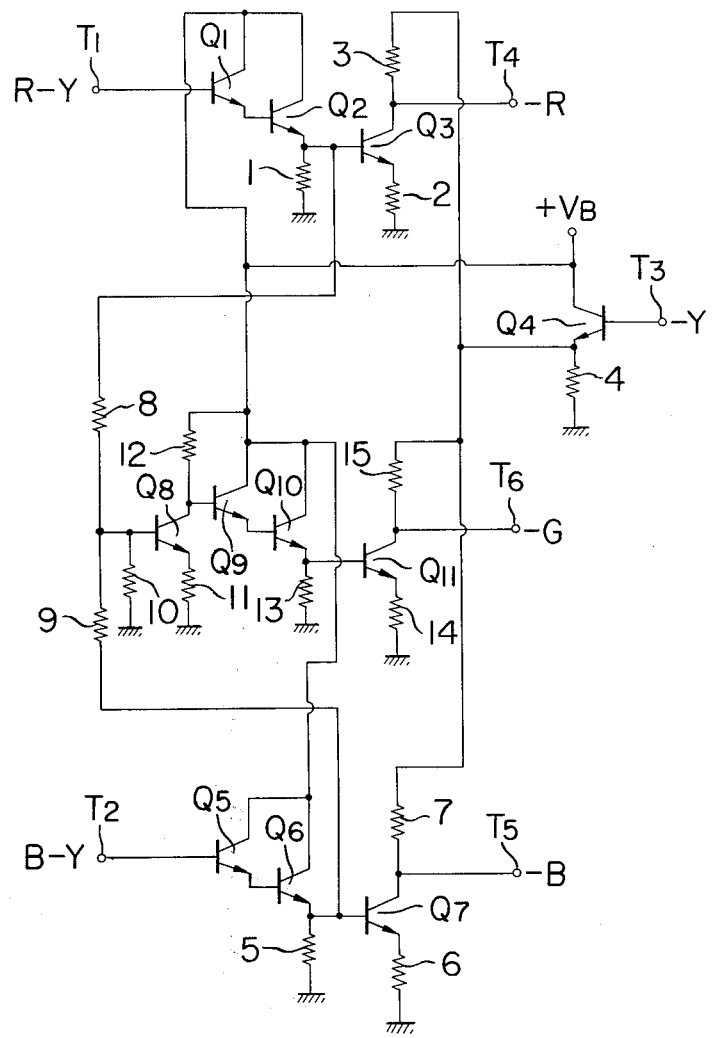
FIG. 1 is a circuit diagram of one example of the prior art video amplifiers for color television receivers.

Prior Art, FIG. 1

Prior to the description of the preferred embodiments of the present invention, one example of the prior art video amplifiers having a transistorized matrix circuit will be described briefly in order to more specifically point out the defects or problems encountered in the prior art video amplifiers.

Referring to FIG. 1, to terminals $T_1$ and $T_2$ are applied the R-Y and B-Y signals, respectively, which are demodulated by a chrominance signal processing circuit. The R-Y signal applied to the input terminal $T_1$ is converted into a low output impedance signal in an impedance converter comprising a Darlington pair consisting of transistors $Q_1$ and $Q_2$ and a resistor 1, and thereafter amplified by a transistor $Q_3$ in the next stage. Since the DC voltage containing the luminance signal is applied from a transistor $Q_4$ to the collector of the transistor $Q_3$, the red primary color signal -R is derived from a terminal $T_4$, that is the collector of the transistor $Q_3$ because the $-(R-Y)$ signal is combined with the luminance signal -Y. In like manner, the B-Y signal applied to the terminal $T_2$ is combined with the luminance signal in the transistor $Q_4$ so that the blue primary color signal -B is derived from a terminal $T_5$.

The G-Y color-difference signal is derived from a matrix circuit consisting of resistors 8, 9, and 10 to which are applied the R-Y signal from the emitter of the transistor $Q_2$ and the B-Y signal from the emitter of a transistor $Q_6$. The polarity of the G-Y signal is opposite to that of the R-Y and B-Y signals, that is $-(G-Y)$. Therefore, the polarity of the $-(G-Y)$ signal is inverted by a transistor $Q_8$, and thereafter, converted into the low output inpedance signal in a circuit comprising a Darlington pair consisting of transistors $Q_9$ and $Q_{10}$ and an emitter resistor 13. The output of the second Darlington pair is amplified by a transistor $Q_{11}$ in the next stage so that the green primary color signal -G is derived from the collector of the transistor $Q_{11}$, that is a terminal $T_6$.

As described above, the prior art video amplifier requires two Darlington configuration impedance conversion circuits in order to minimize the decrease in the highh frequency components of the luminance signal in the primary color output signals. For instance, in order to simplify the circuit, it is preferable to increase the value of the collector resistor 3 of the transistor $Q_3$, which is used for the amplification of the R-Y signal and is also an element in a matrix circuit for combining the amplified R-Y signal with the luminance signal -Y, so that the voltage amplification factor may be increased.

However the feedback capacitance between the base and collector and the collector output capacitance of the transistors used in such circuit are of the order of 1.5 to 2.5 PF so that the high-frequency components of the color difference and luminance signals are negatively fed back due to the feedback capacitance. As a result, the high-frequency components of the primary color signal derived from the collector of the transistor $Q_3$ are lost. In order to minimize the loss of the high-frequency components due to the feedback capacitance, the Darlington pair $Q_1$ and $Q_2$ is provided so that the color difference signal with a low output impedance may be applied to the base of the transistor $Q_3$. In this case, the collector output capacitance becomes 3 to 5 PF because the collector output capacitance is added to the feedback capacitance. Such arrangement has a distinct defect that the value of the collector load resistor 3 cannot be increased because the high-frequency component loss must be minimized in the color difference signal amplifier $Q_3$ which amplifies the color difference signal with a narrow band.

Moreover, the loss of the high-frequency components of the primary color signal cannot be avoided because of the load resistor 3 and the collector output capacitance of the transistor $Q_3$. Same is true for the circuits for recovering the -G and -B primary color signals. The circuit for recovering the -G primary color signal must includes an inverter, that is $Q_8$.

Still referring to FIG. 1, the difference color signal amplifiers are of the common-emitter type so that the excursion of the DC operating point tends to occur due to the ambient temperature variation. Therefore, it is undesirable to provide a directly-coupled stage between the video amplifier and a picture tube. Especially the -G primary color signal changes in the direction opposite to that of the other R and B color signals due to the temperature drift of the inverter so that the white or color balance in the picutre tube is adversely affected.

As described hereinbefore, the prior art video amplifier has the distinct defects (1) that it requires low output impedance conversion circuits in order to minimize the effects caused by the collector feedback capacitance of the transistors used for the amplification of the color difference signals; (2) that the high-frequency components of the luminance signal are adversely affected by the collector output capacitance and the load resistor, thus resulting in the unsatisfactory kinescope reproduction of the picture in color; (3) that the white or color balance of the kinescope is adversely affected by the temperature drift or variation; and (4) that an inverter for inverting the polarity of the G-Y signal must be provided. In view of the above, the present invention was made to overcome the above and other defects and problems encountered in the prior art video amplifiers.

THE INVENTION

Figure 2:
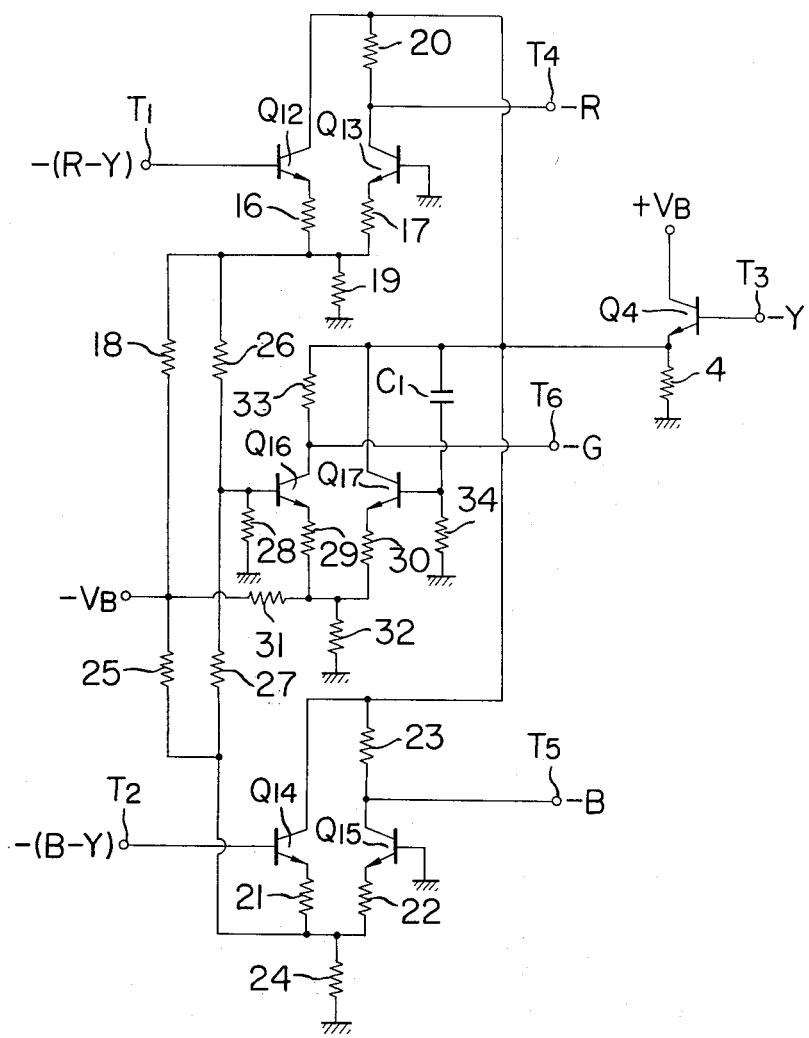
FIG. 2 is a circuit diagram of a first embodiment of the present invention.

Firts Embodiment, FIG. 2

Referring to FIG. 2, the first embodiment of the present invention will be described. The R-Y signal is applied to the input terminal $T_1$ of a differential amplifier comprising transistors $Q_{12}$ and $Q_{13}$, emitter resistors 16 and 17, bias resistors 18 and 19 for giving the negative bias to the emitters of the transistors $Q_{12}$ and $Q_{13}$, respectively, and a collector load resistor 20 for the transistor $Q_{13}$. Since the base of the transistor $Q_{13}$ is grounded, the loss of the high-frequency components of the luminance signal due to the collector feedback capacitance of the transistor $Q_{13}$ may be minimized. The loss of the high-frequency components of the luminance signal due to the collector load resistor 20 and the collector output capacitance of the transistor $Q_{13}$ may be also compensated. The collector of the transistor $Q_{12}$, which has the collector feedback capacitance, is biased by the DC containing the luminance signal so that the high-frequency components of the luminance signal are fed back from the collector to the base of the transistor $Q_{12}$. The transistor $Q_{13}$ in the next stage has its base grounded so that the amplified and in-phase high-frequency components of the luminance signal are derived from the collector of the transistor $Q_{13}$. The high-frequency components of the luminance signal thus derived may effectively compensate the high-frequency components of the luminance signal attenuated by the load resistor 20 and the collector output capacitance of the transistor $Q_{13}$. The above described high-frequency compensation makes it possible to increase the value of the load resistor of the −(R-Y) color difference signal amplification transistor $Q_{13}$. Since this compensation is attained by the fact that the color difference signal demodulator coupled to the base of the transistor $Q_{12}$ has an output impedance, the impedance conversion circuit of the type described with reference to FIG. 1 may be eliminated. The −(R-Y) color difference signal amplifier comprises the differential amplifier circuit having the self-balancing function, and makes up the matrix circuit in which the -Y luminance signal is combined with the −(R-Y) color difference signal. Thus the -R primary color signal which is derived from the output terminal $T_4$, may be applied through a directly-coupled stage to the picture tube because the excursion of the DC operating point due to the ambient temperature variation may be prevented.

In like manner, the −(B-Y) signal applied to the input terminal $T_2$ is amplified and combined with the -Y luminance signal. That is, the −(B-Y) signal amplifier comprises a differential amplifier consisting of transistors $Q_{14}$ and $Q_{15}$, emitter resistors 21 and 22, and a collector load resistor 23 of the transistor $Q_{15}$. The amplified −(B-Y) color difference signal is combined with the -Y luminance signal so that the -B primary color signal may be derived from the terminal $T_5$. Resistors 24 and 25 are inserted in order to give the negative bias to the emitters of the transistors $Q_{14}$ and $Q_{15}$. The mode of operation of the −(B-Y) color difference signal amplifier is substantially similar to that of the −(R-Y) signal amplifier described hereinbefore so that no further description shall be made in this specification.

The G-Y color difference signal may be recovered by combining the (R-Y) and (B-Y) signals in the conventional manner in a matrix circuit, which is shown as comprising three resistors 26, 27, and 28. The output or (G-Y) color difference signal from the matrix circuit is applied to the base of a transistor $Q_{16}$ which makes up a differential amplifier with another transistor $Q_{17}$. The negative bias is applied to the emitters of the transistors $Q_{16}$ and $Q_{17}$ through resistors 29, 30, 31, and 32. The G-Y color difference signal applied to the base of the transistor $Q_{16}$ has its polarity reversed as is clear from the well known matrix equation $$a(R-Y) + b(B-Y) = -(G-Y)$$

where $a$ and $b$ are coefficients. According to the present invention the emitter of the transistor $Q_{16}$ in the G-Y color difference signal amplifier is grounded by way of resistor 28, and the polarity inverted $-(G-Y)$ signal is applied to the collector of the transistor $Q_{16}$. DC potential containing the luminance signal is applied from the emitter of the transistor $Q_4$ through a collector load resistor 33 to the collector of the transistor $Q_{16}$. Therefore the -Y luminance signal is combined with the G-Y color difference signal so that the -G primary color signal is derived from the collector of the transistor $Q_{16}$, that is, the terminal $T_6$. The loss of the high-frequency components of the luminance signal may be effectively compensated by the transistor $Q_{17}$, a capacitor C1 and a resistor 34.

The transistor $Q_{16}$ in the G-Y color difference signal amplifier is driven in the common-emitter mode so that the output is derived from its collector. The base of the transistor $Q_{16}$ is connected to the matrix resistors 26, 27, and 28 so that its impedance is of the order of a few kilo ohms. Therefore the high-frequency components of the luminance signal in the DC collector bias are fed back to the base due to the feedback capacitance between the collector and base of the transistor $Q_{16}$ so that the amplified and phase-inverted high-frequency components of the luminance signal are negatively fed back to the collector. Since the base of the transistor $Q_{17}$ is grounded through the resistor 34, the high-frequency components of the luminance signal in the collector bias is fed back to the base of the transistor $Q_{17}$. Since the transistors $Q_{16}$ and $Q_{17}$ make up the differential amplifier, the high-frequency components of the luminance signal fed back to their bases are in-phase and equal in amplitude. Thus, it is apparent that there exists no negative feedback which would result in the amplified and phase-inverted high-frequency components of the luminance signal at the collector output terminal because the high-frequency components are fed back to the base. Thus, the loss of the high-frequency components of the luminance signal due to the feedback capacitance between the collector and base of the output transistor may be compensated.

The loss of the high-frequency components of the luminance signal due to the collector output capacitance and collector load resistor 33 of the transistor $Q_{16}$ may be effectively compensated by the feedback of the high-frequency components of the luminance signal through the capacitor $2_1$ interconnected between the collector and base of the transistor $Q_{17}$. Like the $-(R-Y)$ and $-(B-Y)$ color difference signal amplifiers, the G-Y color difference signal amplifier comprises the differential amplifier having the self-balancing function so that the G-Y signal is combined with the luminance signal to produce the -G primary color signal at the terminal $T_6$. The -G primary color signal will not cause the excursion of the DC operating point due to the ambient temperature variation. Therefore the directly-coupled stage to the kinescope may be simplified in construction.

Figure 3:
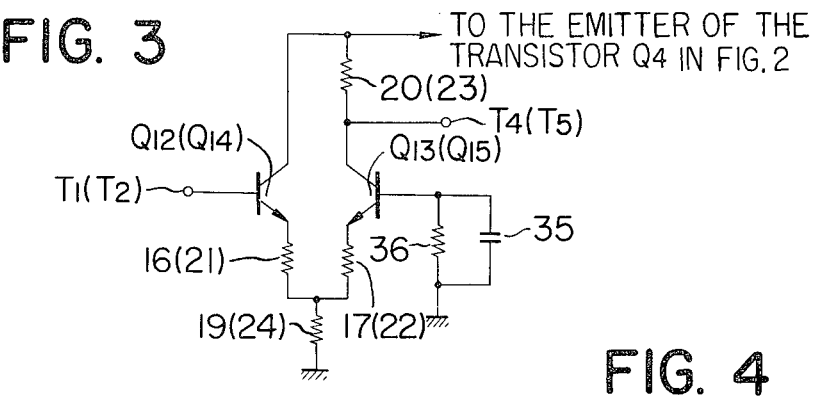
FIGS. 3, 4, 5, and 6 are schematic circuit diagrams of a second, third, fourth and fifth embodiments of the present invention, respectively, constituting modifications of a portion of the circuit of FIG. 2.

Second Embodiment, FIG. 3

The second embodiment to be described with reference to FIG. 3 is substantially similar in construction to the first embodiment shown in FIG. 2 except that a parallel circuit consisting of a capacitor 35 and a resistor 36 is interconnected between the ground and the base of one transistor $Q_{13}$ (or $Q_{15}$) which makes up the differential amplifier with the other transistor $Q_{12}$ (or $Q_{14}$). When the value of the resistor 36 is suitably selected so that the base bias voltages of the transistors $Q_{12}$ (or $Q_{14}$) and $Q_{13}$ (or $Q_{15}$) may be made equal to each other, the drift due to the ambient temperature variation may be satisfactorily compensated.

Figure 4:
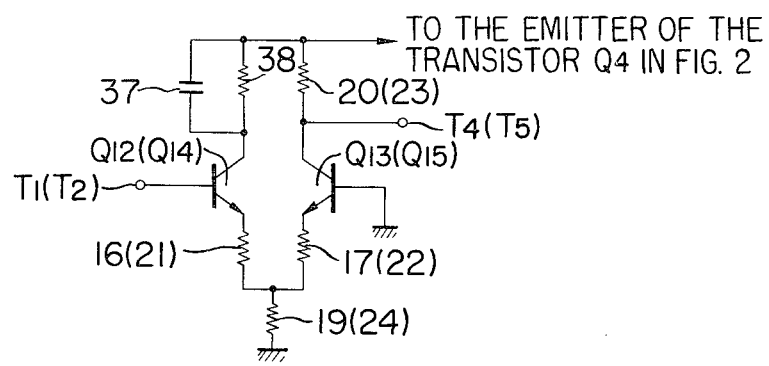

Third Embodiment, FIG. 4

The third embodiment to be described hereinafter with reference to FIG. 4 is substantially similar in construction to the second embodiment except that a parallel circuit consisting of a capacitor 37 and a resistor 38 is interconnected between the collectors of the transistors $Q_{12}$ and $Q_{13}$ (or $Q_{14}$ and $Q_{15}$). The collector currents of the transistors $Q_{12}$ and $Q_{13}$ (or $Q_{14}$ and $Q_{15}$) are made substantially equal by suitably selecting the value of the resistor 38.

Figure 5:
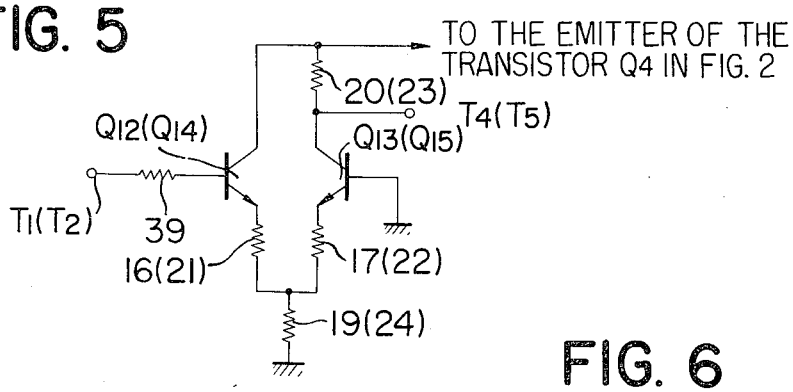

Fourth Embodiment, FIG. 5

The fourth embodiment shown in FIG. 5 is substantially similar in construction to the first embodiment shown in FIG. 2 except that a resistor 39 is connected in series to the base of the transistor $Q_{12}$ (or $Q_{14}$) so that the feedback from the collector to the base of the transistor $Q_{12}$ (or $Q_{14}$) may be increased. Therefore the loss of the high-frequency components in the luminance signal may be well compensated.

Figure 6:
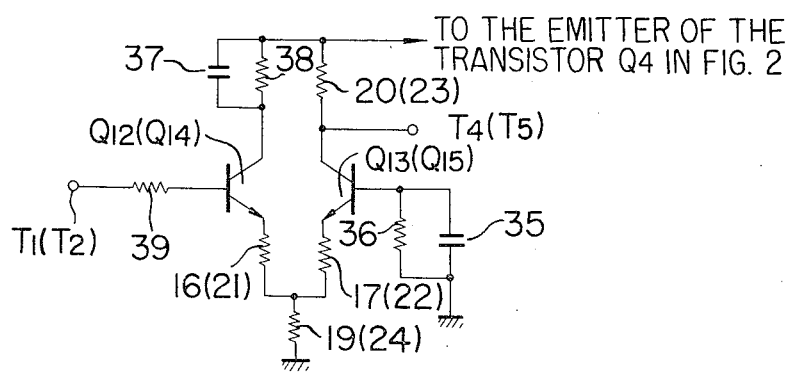

Fifth Embodiment, FIG. 6

The fifth embodiment shown in FIG. 6 is the combination of the second, third and fourth embodiments shown in FIGS. 3, 4, and 5, respectively. That is, the parallel circuit consisting of the resistor 35 and the capacitor 36 is interconnected between ground and the base of the transistor $Q_{12}$ (or $Q_{15}$), another parallel circuit consisting of the capacitor 37 and the resistor 38 is placed between the collectors of the transistors $Q_{12}$ and $Q_{13}$ (or $Q_{14}$ and $Q_{15}$), and the resistor 39 is connected in series to the base of the transistor $Q_{12}$ (or $Q_{14}$). The adverse effects caused by the ambient temperature variation may be further minimized and the loss of the high-frequency components of the luminance signal may be further well compensated.

What is claimed is:

1. A video amplifier for deriving a primary color signal from a luminance signal and a color difference signal, comprising a source of a DC voltage having said luminance signal impressed thereon, means providing a color difference signal, first and second transistors connected to form a differential amplifier, means continually connecting the collector of one of said transistors to said source, a resistor continually connecting the collector of the other of said transistors to said source, means applying said color difference signal to the base of said first transistor, and an output terminal connected to the collector of the other transistor, whereby said primary color signal is produced at said output terminal.

2. The video amplifier of claim 1 wherein said one transistor is said first transistor, and the collector of said first transistor is connected directly to said source of DC voltage.

3. The video amplifier of claim 1 wherein said one transistor is said first transistor, and said means connecting the collector of said one transistor to said source of DC voltage comprises a parallel connected resistor and capacitor.

4. The video amplifier of claim 1 wherein said one transistor is said first transistor, and said means applying said color difference signal to the base of said first transistor comprises a resistor, whereby said color difference signal is applied to the base of said first transistor by way of said last mentioned resistor.

5. The video amplifier of claim 1 wherein said one transistor is said second transistor, further comprising a capacitor connected between the base of said second transistor and said source.

6. The video amplifier of claim 5 wherein the collector of said second transistor is directly connected to said source.

7. The video amplifier of claim 1 wherein said means applying said color difference signal to the base of said first transistor comprises a resistor, whereby said color difference signal is applied to the base of said first transistor by way of said last mentioned resistor, said means connecting the collector of said one transistor to said source comprises a parallel circuit of a resistor and a capacitor.

* * * * *